United States Patent
Vertriest

(10) Patent No.: US 7,070,393 B2
(45) Date of Patent: Jul. 4, 2006

(54) METHOD FOR REGULATING A COMPRESSOR INSTALLATION WITH A DRYER AND COMPRESSOR INSTALLATION USED THEREWITH

(75) Inventor: Danny Etienne Andrée Vertriest, Kontich (BE)

(73) Assignee: Atlas Copco Airpower, naamloze vennootschap, Wilrijk (BE)

( * ) Notice: Subject to any disclaimer, the term of this patent is extended or adjusted under 35 U.S.C. 154(b) by 0 days.

(21) Appl. No.: 10/399,392

(22) PCT Filed: Oct. 29, 2001

(86) PCT No.: PCT/BE01/00187

§ 371 (c)(1),
(2), (4) Date: Apr. 21, 2003

(87) PCT Pub. No.: WO02/38251

PCT Pub. Date: May 16, 2002

(65) Prior Publication Data

US 2003/0188542 A1    Oct. 9, 2003

(30) Foreign Application Priority Data

Nov. 8, 2000    (BE) .............................. 2000/0713

(51) Int. Cl.
*F04B 49/00*    (2006.01)

(52) U.S. Cl. ................ 417/43; 417/243; 417/44.2; 417/32; 34/468; 34/473; 34/588; 34/596; 34/75

(58) Field of Classification Search .......... 417/313, 417/44.2, 243, 43; 34/467, 468, 472, 473, 34/588, 596, 73, 75
See application file for complete search history.

(56) References Cited

U.S. PATENT DOCUMENTS

| | | | | |
|---|---|---|---|---|
| 4,447,249 A * | 5/1984 | Kopena ........................ | 65/379 |
| 4,944,776 A * | 7/1990 | Keyser et al. ................. | 95/10 |
| 5,002,593 A * | 3/1991 | Ichishita et al. .............. | 96/137 |
| 5,131,929 A * | 7/1992 | Brockmann et al. ........... | 95/52 |
| 5,234,479 A * | 8/1993 | Henderson et al. ........... | 95/105 |
| 5,322,626 A * | 6/1994 | Frank et al. ................. | 210/634 |
| 5,385,603 A * | 1/1995 | Sienack ....................... | 96/125 |
| 5,474,594 A * | 12/1995 | Khelifa et al. ................ | 95/14 |
| 5,632,802 A * | 5/1997 | Grgich et al. ................. | 95/10 |
| 5,681,370 A * | 10/1997 | McMahon ................... | 95/105 |
| 5,746,807 A * | 5/1998 | Thelen et al. ................ | 95/123 |
| 6,171,377 B1 * | 1/2001 | Henderson ................... | 96/122 |
| 6,221,130 B1 * | 4/2001 | Kolodziej et al. ............ | 95/41 |
| 6,527,836 B1 * | 3/2003 | White et al. .................. | 96/113 |
| 6,783,571 B1 * | 8/2004 | Ekeroth .......................... | 95/8 |
| 2002/0056828 A1 * | 5/2002 | Hallman ...................... | 252/69 |

\* cited by examiner (Continued)

*Primary Examiner*—Tae Jun Kim
*Assistant Examiner*—Emmanuel Sayoc
(74) *Attorney, Agent, or Firm*—Bacon & Thomas, PLLC

(57) ABSTRACT

The invention relates to a method for regulating a compressor installation with at least one compressor element (6) driven by a motor and, in the pressure conduit (11) thereof, a dryer (2) of the type comprising a pressure vessel (24) with a drying zone (3) and a regeneration zone (4), and a rotor (25) continuously rotated in this pressure vessel (24) by a motor (33), which rotor is filled with a regenerable drying agent. A portion of the compressed air is supplied, by means of a branch (15), to the regeneration zone (4) and, after cooling down and separation of the condensed water, is fed back to the pressure conduit (11). The speed of both motors (9, 33) is regulated by a regulation device (13) in function of the pressure in the pressure conduit (11).

11 Claims, 4 Drawing Sheets

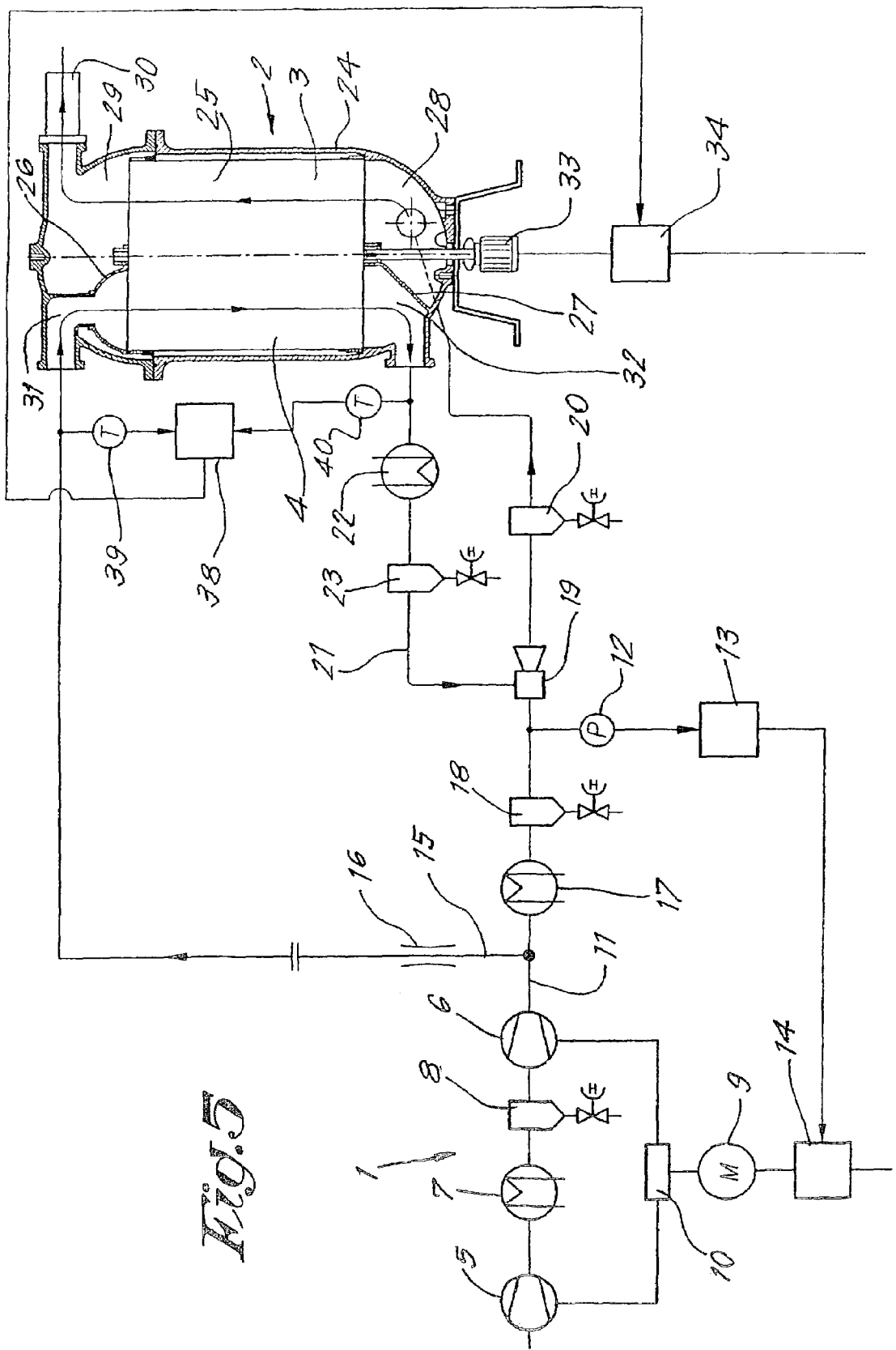

METHOD FOR REGULATING A COMPRESSOR INSTALLATION WITH A DRYER AND COMPRESSOR INSTALLATION USED THEREWITH

BACKGROUND

This invention relates to a method for regulating a compressor installation with at least one compressor element and, in the pressure conduit thereof, at least one cooler, at least one water separator and a dryer of the type comprising a pressure vessel with a drying zone and a regeneration zone, a rotor rotating in this pressure vessel, which rotor is filled with a regenerable drying agent, whereby the compressor element is driven by an electric motor, a portion of the compressed air delivered by this compressor element is branched off in the cooler before being cooled, is supplied, by means of a branch, towards the regeneration zone and, after cooling down and separation of the condensed water, is fed back to the pressure conduit, and whereby the rotor in the dryer is continuously rotated by means of an electric motor, such that the drying agent is continuously moved from the drying zone to the regeneration zone and back to the drying zone.

Compressor installations provided with an adsorption dryer are described, for example, in the patent documents U.S. Pat. No. 5,385,603 and GB-A-1.349.733.

In these compressor installations, the compressor element as well as the rotor are continuously driven at the same speed.

This means that the flow rate delivered by the compressor element remains constant or varies only within certain limits.

Increasingly, however, use is made of energy-saving compressor installations, whereby the flow rate delivered by the compressor element is adjusted to consumption. The compressor element thus is driven at a varying speed in function of said flow rate, as a result of which the power consumed by the motor of the compressor element can be restricted to a minimum.

This is achieved, for example, by driving the compressor element by an electric motor which is controlled by a frequency converter.

As the flow rate may vary within a broad range of 20% to 100%, these energy-saving compressor installations can not comprise a dryer of the aforementioned type. With a low flow rate delivered, the flow rate through the regeneration zone is too small to allow for a sufficient regeneration of the drying agent within the period of time during which the latter is present in the regeneration zone.

Due to the high dew point, an insufficient regeneration results in a shorter service life of the dryer.

SUMMARY

The invention aims at a method for regulating a compressor installation with a dryer of the type described in the first paragraph, which allows to save energy.

According to the invention, this aim is achieved in that the speed of the motor driving the compressor element is regulated in function of the consumption of compressed gas, whereas the speed of the motor driving the rotor of the dryer is regulated in function of at least one parameter of the compressed gas which is fed through the dryer.

The speed of the motor of the compressor element can be regulated such that the pressure measured at the outlet of the compressor element or at the outlet of the dryer remains almost constant.

The speed of the motor driving the rotor of the dryer also can be regulated in function of the consumption of compressed air.

Thus, the motor driving the compressor element, as well as the motor driving the rotor of the dryer can be regulated by one and the same regulation device in function of the consumption.

To this aim, this regulation device can regulate in function of the pressure prevailing in the pressure conduit, either between the compressor element and the dryer, preferably between the water separator and the dryer, or at the outlet of the dryer, whereby then the measured pressure is the parameter.

In another form of embodiment, the speed of the motor of the rotor of the dryer is regulated in function of the temperature drop in the regeneration zone of the dryer, whereby thus the temperatures at the inlet and outlet of the regeneration zone form the parameters for regulating the speed of the motor of the rotor.

The invention also relates to a compressor installation which is particularly suitable for applying said method.

The invention thus also relates to a compressor installation with at least one compressor element, driven by an electric motor, and in the pressure conduit of said element at least one cooler, at least one water separator and a dryer of the type comprising a pressure vessel with a drying zone and a regeneration zone, a rotor rotating in this pressure vessel, which rotor is filled with a regenerable drying agent, and an electric motor for continuously rotating said rotor, such that the drying agent successively is moved through the drying zone and the regeneration zone, whereby a branch extends from the portion of the pressure conduit, situated between the compressor element and the cooler, towards the inlet of said regeneration zone, and a return conduit extends over a cooler and a second water separator from the outlet of said regeneration zone towards the pressure conduit.

According to the invention, said compressor installation is characterized in that the motor driving the compressor element as well as the motor driving the rotor is a motor with adjustable speed, whereby the motor driving the compressor element is coupled to a regulation device which regulates the speed of this motor in function of the consumption, whereas the motor driving the rotor of the dryer also is coupled to a regulation device which regulates the speed of this motor in function of at least one parameter of the compressed gas which is fed through the drying zone or the regeneration zone of the dryer.

The motor driving the compressor element, as well as the motor driving the rotor of the dryer can be coupled to one and the same regulation device which regulates the speed of both motors in function of the consumption.

To this aim, this regulation device preferably is coupled to a pressure gauge installed in the pressure conduit, either between the compressor element and the dryer, preferably between the water separator and the dryer, or at the outlet of the dryer, whereby then the measured pressure is the parameter.

When the consumption of compressed air increases, the pressure measured by the pressure gauge will tend to drop, as a consequence of which the regulation device will have the motor of the compressor element go faster and the air production or air flow rate consequently increases. The regulation device provides for that the pressure remains constant.

In another form of embodiment of the invention, the regulation device regulating the speed of the motor which drives the rotor of the dryer, is coupled to temperature meters situated upstream or downstream from the regeneration zone of the dryer, respectively.

The compressor installation may comprise a multistage compressor with more than one compressor element. In this case, the compressor element intended in the aforegoing is the last or the high-pressure stage.

BRIEF DESCRIPTION OF THE DRAWINGS

With the intention of better showing the characteristics of the invention, hereafter, as an example without any limitative character, four preferred forms of embodiment of a method for regulating a compressor installation with a dryer and a compressor installation used therewith are described, with reference to the accompanying drawings, wherein:

FIGS. 4 and 5 schematically represent a compressor installation analogous to that of FIG. 1, however, relating to two other forms of embodiment.

DETAILED DESCRIPTION OF VARIOUS EMBODIMENTS

Figure 1:
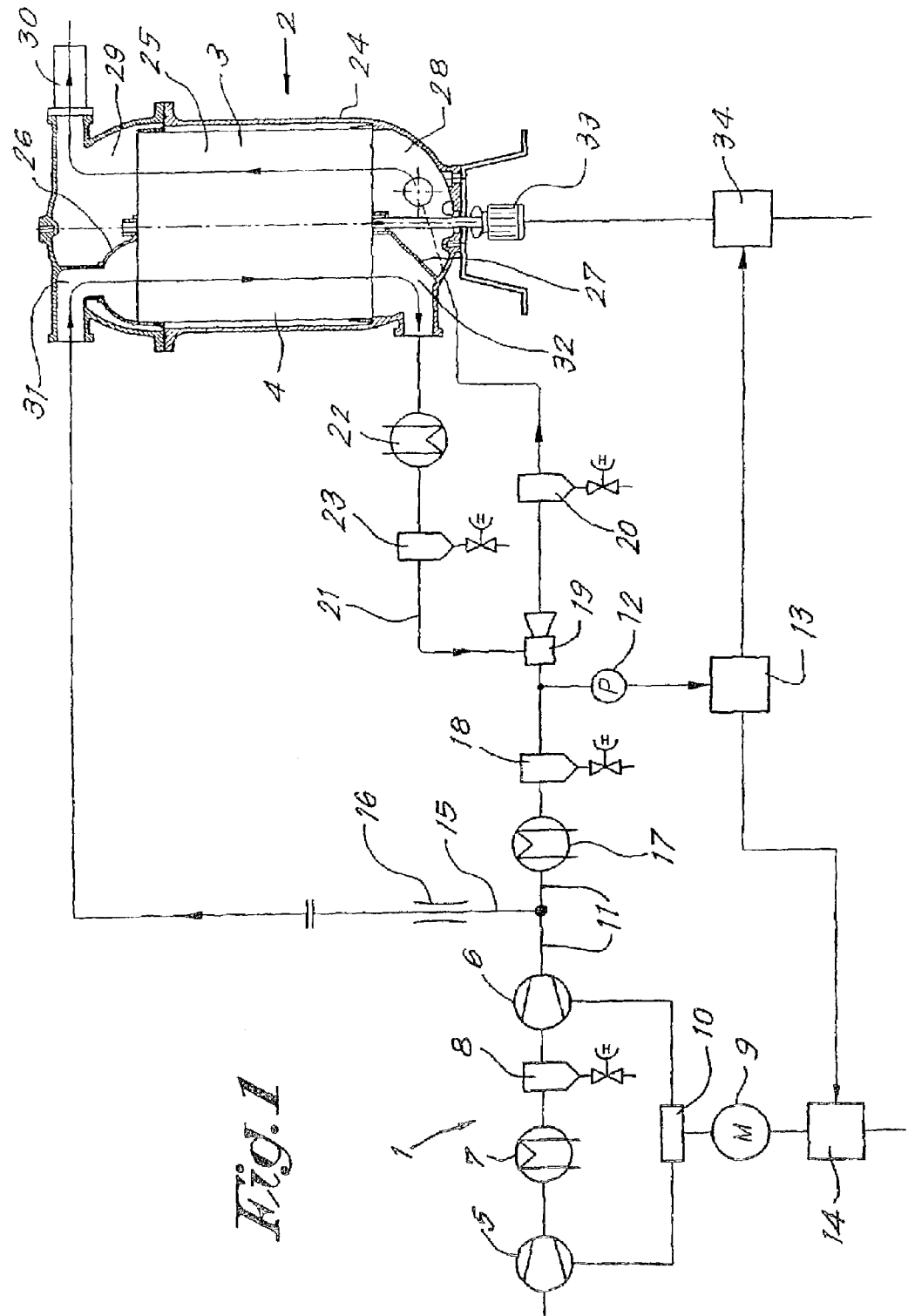
FIG. 1 schematically represents a compressor installation with a dryer according to the invention.

The compressor installation with dryer, represented in FIG. 1, substantially comprises a two-stage compressor 1 and a dryer 2 with a drying zone 3 and a regeneration zone 4.

The two-stage compressor 1 comprises a low-pressure compressor element 5, a high-pressure compressor element 6 with in between an intermediate cooler 7, followed by a water separator 8, and a drive consisting of an electric motor 9 and a transmission 10 for driving the two compressor elements 5 and 7.

To the outlet of the two-stage compressor 1, the pressure conduit 11 is connected, in which a pressure gauge 12 is installed which is coupled to a regulation device 13 which, by means of a frequency converter 14, regulates the number of revolutions of the motor 9 in function of the pressure measured by the pressure gauge 12 or, in other words, of the consumption of compressed air.

Still before the pressure gauge 12, a branch 15 is connected to the pressure conduit 11, which branch gives out to the inlet of the regeneration zone 4 of the dryer 2 and which comprises a throttle valve 16. The pressure of the compressed air entering the regeneration zone 4 can be regulated by the throttle valve 16.

Further, a cooler 17, a water separator 18, an ejector pipe 19 and a second water separator 20 are installed in the pressure conduit 11 before the pressure conduit gives out into the inlet of the drying zone 3 of the dryer 20

A return conduit 21 connected to the outlet of the regeneration zone 4 gives out in the low-pressure zone of the ejector pipe 19. In this return conduit 21, between the regeneration zone 4 and the ejector pipe 19, successively a cooler 22 and a water separator 23 are installed.

The dryer 2 is of the type comprising a pressure vessel 24 in which a rotor 25 is rotatably installed, which rotor consists of a bundle of tubes which are filled with regenerable drying agent, such as, for example, silica gel.

The pressure vessel 24 is separated into a drying zone 3 and a regeneration zone 4, and to this end the extremities of the pressure vessel 24 are separated in two compartments, by means of partitions 26 and 27.

In the figure, the pressure vessel 24 and the rotor 25 are installed vertically, and the two compartments 28 and 29 which are situated below and above the rotor 25, respectively, form part of the drying zone 3.

The pressure conduit 11 gives out in the compartment 28, whereas the compartment 29 is provided with an outlet 30 for connecting the compressed air net for the consumers. The portion of the rotor 25 situated between these compartments 28 and 29 thus is situated in the drying zone 3, and the drying agent present in this portion therefore is used for drying the compressed air.

In an analogous manner, the compartments 31 and 32 which, in the figure, are situated above and below, the rotor 25, respectively, form part of the regeneration zone 4, as well as the portion of the rotor 25 situated between these compartments 31 and 32.

The branch 15 gives out in the compartment 31, whereas the return valve 21 starts from the compartment 32.

The rotor 25 is continuously rotated around its axis by an electric motor 33.

The motor 33 is controlled, by the intermediary of a frequency converter 34, by the regulation device 13 in function of the number of revolutions of the motor 9.

The control of the compressor installation is performed as follows:

By means of the frequency converter 14, the regulation device 13 regulates the number of revolutions of the motor 9 in function of the consumption. When the consumption of compressed air increases, then the pressure measured by the pressure gauge 12 will start to drop. Therefore, the regulation device 13 immediately provides for that the frequency of the frequency converter 14 is increased and the motor 9 rotates faster, such that the air yield or the air flow rate Q increases and the pressure again rises to its initial value and therefore, seen over a period of time, practically remains constant.

The ratio between the speed of the motor and the flow rate Q is linear. With a frequency of, for example, 60 Hz, the speed of the motor is maximum, and the two-stage compressor 1 delivers its maximum flow rate. With a frequency of, for example, 20 Hz, the speed of the motor and the flow rate are minimum, for example, 30% of the maximum.

Via the branch 15, one to 40% of said flow rate is branched off and supplied to the regeneration zone 4, where the hot compressed air provides for the regeneration of the drying agent This moisture laden compressed air is directed over the cooler 22, where a part of the taken-up moisture condenses. The condensate is separated in the water separator 23.

The air, which now is dryer and cold, is blended in the ejector pipe 19 with the not-branched off compressed air which has been cooled in the cooler 17 and from which the condensate has been separated in the water separator 18.

Possible droplets which still are present are separated from the mixture in the water separator 20 before being dried in the drying zone 3.

The rotor 25 is continuously rotated, such that drying agent from the drying zone 3 is continuously brought into the regeneration zone 4.

This rotation, however, is not performed at a constant speed, but also is regulated, by the intermediary of the frequency converter 34, by the regulation device 13.

Figure 2:
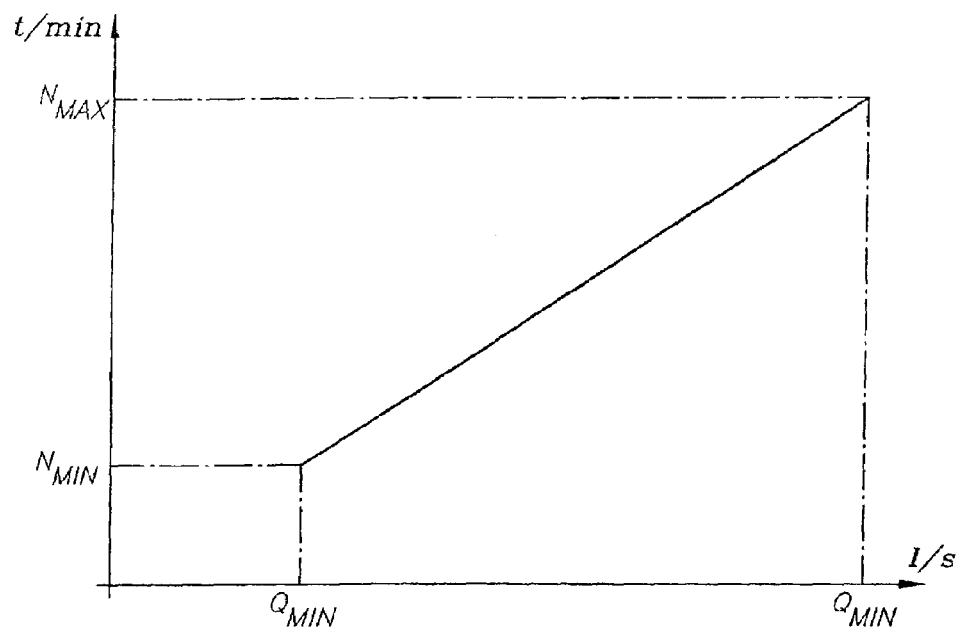
FIG. 2 represents a diagram with the speed of the rotor in function of the delivered flow rate.

The number of revolutions N of the motor 33 and, therefore, of the rotor 25 is regulated such that the pressure measured by the pressure gauge 12 remains constant, which means that this number of revolutions in fact is regulated in function of the consumption or, in other words, the flow rate Q. Thus, the number of revolutions N of the motor 33 in fact is parallel to the flow rate Q, as represented in FIG. 2, in which this number of revolutions N is represented in revolutions per minute, in function of the flow rate Q in liters per second.

In consideration of the fact that also the motor 9 is regulated in function of the flow rate Q or, in other words, the consumption of compressed air, the motors 9 and 33 in practice are regulated in a similar manner, which therefore may be performed by one and the same regulation device 13.

When, thus, the flow rate Q of the compressed air drops as a result of a lower speed of the motor 9, there is a smaller air flow rate available for regeneration in the dryer 2. In order to still be able to regenerate an equal volume with drying agent, the rotor 25 is rotating slower as the motor 33 is running slower, such that the limited flow rate of air for the regeneration now is given more time for performing such regeneration.

Also in the drying zone 3, with a dropping compressed air flow rate Q less compressed air is supplied, however, as a result of the lower speed of the rotor 25, the compressed air remains in longer contact with the drying agent.

With any consumption or air flow rate Q delivered by the two-stage compressor 1, regulation device 13 chooses the optimum speed for the rotor 25, such that drying and regeneration is performed in a sufficient manner.

Thus, the dryer 2 can operate efficiently, this is with a sufficiently low dew point of the dried air at the outlet of dryer 2, with a broad range of air flow rates Q.

Figure 3:
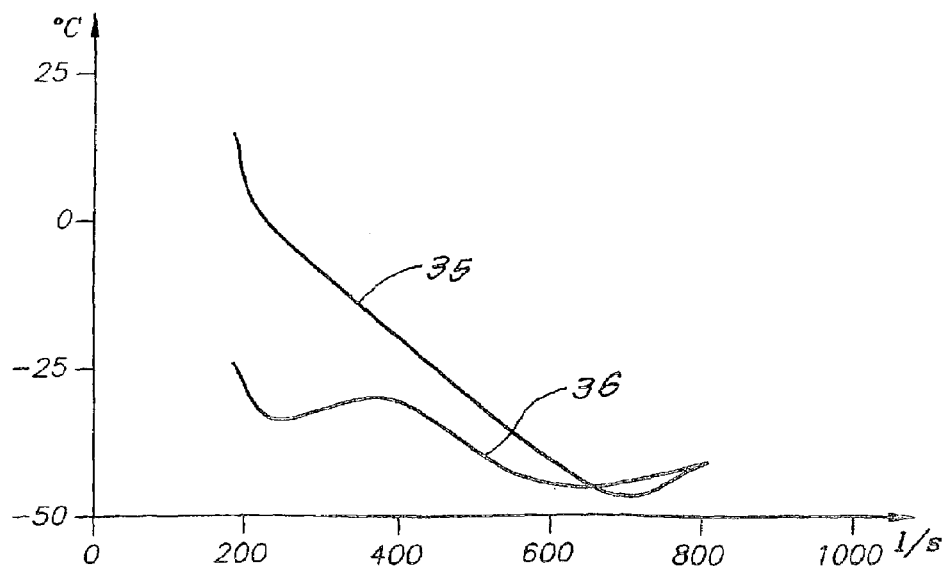
FIG. 3 represents the dew point of the outgoing dry air in function of the flow rate, with a constant as well as a variable rotor speed.

With a constant number of revolutions N of the rotor 25, this would not be the case, as is represented in FIG. 3, in which the dew point in ° C. is represented for the outgoing dry air in function of the flow rate Q delivered by the compressor 1 in l/s, with a constant speed of the rotor 25 (line 35) and with a speed regulated in the manner described heretofore (line 36), respectively.

In this latter case, the dew point varies relatively little and remains sufficiently low for different flow rates Q.

In another form of embodiment, the pressure in the pressure conduit can be measured at the outlet of dryer 2 instead of between the compressor 1 and said dryer 2.

Figure 4:
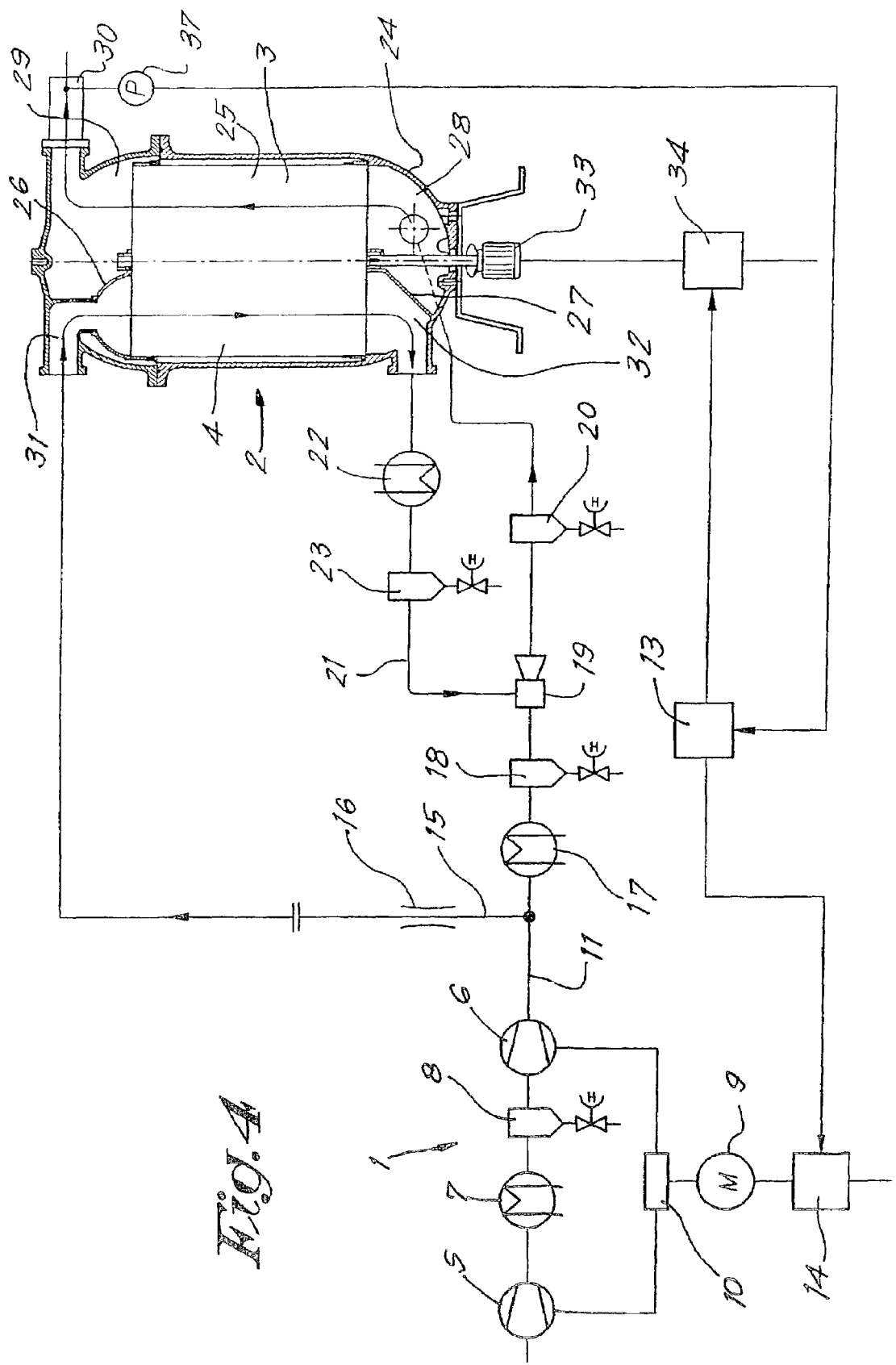

Thus, in FIG. 4 a form of embodiment of the compressor installation is represented which only differs from the one according to FIG. 1 in that the pressure gauge 12 coupled to the regulation device 13 is replaced by a pressure gauge 37 which is installed at the outlet 30 of the compartment 29 and, therefore, at the outlet of dryer 2.

Also in this embodiment, the regulation device 13 regulates the speed of the motors 9 and 33 such that the pressure remains approximately constant and, therefore, in function of the consumption of compressed air.

Instead of using the pressure in the pressure conduit as a parameter for regulating the speed of motor 33 driving dryer 2, other parameters may be used, such as parameters which are a measure for the quality of the regeneration process in the regeneration zone 4.

An indication of this quality is the temperature difference $\Delta T = T_2 - T_1$ between the inlet and the outlet of the regeneration zone 4. During the regeneration process, the compressed air, which flows into the dryer and, thus, the regeneration zone 4, at a temperature $T_1$, cools down to a temperature $T_2$ which it has at the outlet of this regeneration zone 4.

The larger the temperature difference $\Delta T$, the less regeneration still is possible Generally, it is presumed that, in order to obtain a sufficient regeneration, this temperature difference maximum may be 70° C., whereas the temperature at the outlet of the regeneration zone 4 must be minimum 60° C.

An insufficient regeneration results in a disadvantageous dew point and a short service life of the rotor 25 of the dryer 2.

The speed of the motor 33 driving the rotor 25 now can be regulated by means of a separate regulating device 38 in function of this temperature difference $\Delta T$.

In FIG. 5, a compressor installation is represented differing from that according to FIGS. 1 and 4 in that it comprises a separate regulation device 38 which regulates the speed of the motor 33 by means of frequency converter 34 and which is coupled to a temperature meter 39 which is installed downstream of the regeneration zone 4, to wit in the branch 15, before compartment 31, and to a temperature meter 40 which is installed downstream of regeneration zone 4, to wit in the return conduit 21, beyond compartment 32.

The speed of the motor 9 of the compressor 1 remains regulated by the regulation device 13 in the above-described manner, however, the speed of motor 33 is regulated by regulation device 38 in function of the difference between the temperature $T_1$ measured by the temperature meter and the temperature $T_2$ measured by temperature meter 40.

In still another form of embodiment, the dew point may be used as a parameter for regulating the speed of motor 33, in which case the regulation device 38 is coupled to a dew point meter.

The compressor 1 does not necessarily have to be a two-stage compressor. It may, for example, comprise only one compressor element 6.

The driving of motor 25 must not necessarily be performed axially, such as represented. The rotor 25 can be provided at its circumference with teeth and can be driven by means of a gearwheel transmission and those teeth. The motor then may be installed next to the pressure vessel 24.

This pressure vessel 24 does not necessarily have to be installed vertically. It may also be in horizontal position.

The invention is in no way limited to the forms of embodiment described in the aforegoing and represented in the figures, on the contrary, such method for regulating a compressor installation with a dryer and compressor installation used therewith may be realized in various variants, without leaving the scope of the invention.

The invention claimed is:

1. A method for regulating a compressor installation having at least one compressor element (6), and, a pressure conduit (11) including at least one cooler (17), at least one water separator (18) and a dryer (2) of the type comprising a pressure vessel (24) with a drying zone (3) and a regeneration zone (4), a rotor (25) rotating in this pressure vessel (24), the rotor being filled with a regenerable drying agent, the method comprising the steps of:

driving the compressor element (6) by an electric motor (9), a portion of the compressed air delivered by the compressor element (6) being branched off before being cooled in the cooler (17) and supplied by means of a branch (15) to the regeneration zone (4) and, after cooling down and separation of the condensed water, being fed back to the pressure conduit (11);

continuously rotating the rotor (25) in the dryer (2) by means of an electric motor (33), such that the drying agent is continuously moved from the drying zone (3) to the regeneration zone (4) and back to the drying zone (3); and regulating the speed of the motor (9) driving the compressor element (6) as a function of the consumption of compressed gas, whereas the speed of the motor (33) driving the rotor (25) of the dryer (2) is regulated in function of at least one parameter of the compressed gas which is fed through the dryer (2);

wherein the motor (9) driving the compressor element (6) and the motor (33) driving the rotor (25) of the dryer (2) are regulated by one and the same regulation device (13) as a function of the consumption.

2. The method according to claim 1, wherein the speed of the motor (9) of the compressor element (6) is regulated such that the pressure measured at the outlet of the compressor element (6,7) or at the outlet of the dryer (2) remains approximately constant.

3. The method according to claim 1, wherein the speed of the motor (33) driving the rotor (25) of the dryer (2) is regulated as a function of the consumption of compressed air.

4. The method according to claim 1, wherein the regulation device (13) regulates the speed of the motors (19 and 33) as a function of the pressure prevailing in the pressure conduit (11), either between the (15) compressor element (6) and the dryer (2), or at the outlet of the dryer (2) such that the measured pressure is acting as the parameter.

5. The method according to claim 1, wherein the speed of the motor (33) of the rotor (25) of the dryer (2) is regulated as a function of the temperature drop in the regeneration zone (4) of the dryer (2), such that the temperatures at the inlet and the outlet of the regeneration zone (4) form the parameters for the regulation of the speed of the motor (33) of the rotor (9).

6. A compressor installation comprising at least one compressor element (6) driven by an electric motor (9) and a the pressure conduit (11) including at least one cooler (17), at least one water separator (18) and a dryer (2) of the type comprising a pressure vessel (24) with a drying zone (3) and a regeneration zone (4), a rotor (25) rotating in this pressure vessel (24), which rotor is (35) filled with a regenerable drying agent, and an electric motor (33) for continuously rotating this rotor (25), such that the drying agent successively is moved through the drying zone (3) and the regeneration zone (4), wherein a branch (15) extends from the portion of the pressure conduit (11) which is situated between the (5) compressor element (6) and the cooler (17) towards the inlet of said regeneration zone (4), and a return conduit (21) extends from the outlet of this regeneration zone (4) over a cooler (22) and a second water separator (23) back to the pressure conduit (11);

wherein the motor (9) driving the compressor element (6), as well as the motor (33) driving the rotor (25) is a motor with adjustable speed, the motor (9) driving the compressor element (6) being coupled to a regulation device (13) which regulates the speed of this motor (9) as a function of the consumption, whereas the motor (33) driving the rotor (25) of the dryer (2) also being coupled to a regulation device (13,38) which regulates the speed of the motor (9) as a function of at least one parameter of the compressed gas which is fed through the drying zone (3) or the regeneration zone (4) of the dryer (2);

wherein the motor (9) driving the compressor element (6) and the motor (33) driving the rotor (25) of the dryer (2) are coupled to one and the same regulating device (13) which regulates the speed of both motors (9,33) as a function of the consumption.

7. The compressor installation according to claim 6, wherein the regulating device (13) is coupled to a pressure gauge (12) installed in the pressure conduit (11) between the compressor element (6) and the dryer (2) such that the measured pressure is the parameter.

8. The compressor installation according to claim 6, wherein the regulation device (13) is coupled to a pressure gauge (12) installed in the pressure conduit (11) at the outlet of the dryer (2), such that the measured pressure is the parameter.

9. The compressor installation according to claim 6, wherein the regulation device (14) regulating the speed of the motor (33) which drives the rotor (25) of the dryer (2), is coupled to temperature meters (39,40) which are situated upstream and downstream of the regeneration zone (4) of the dryer (2), respectively.

10. The compressor installation according to claim 6, further comprising a multistage compressor with more than one, compressor element and that said compressor element (6) driven by the motor (9) is the last or the high-pressure stage.

11. The compressor installation according to claim 6, further comprising an ejector pipe (19) in the pressure conduit (11), located after the cooler (17) and the water separator (18), and that the return conduit (21) is located on one side of said ejector pipe (19).

* * * * *